Patented Dec. 17, 1935

2,024,406

UNITED STATES PATENT OFFICE 2,024,406

PRIMING COMPOSITION

Alfred Weale, Heswall, England, assignor to Imperial Chemical Industries Limited, a corporation of Great Britain No Drawing. Application December 1, 1932, Serial No. 645,229. In Great Britain December 14, 1931

5 Claims. (Cl. 52—3)

This invention relates to improvements in priming compositions as used in percussion caps, and its principal object is to minimize objectionable residue in the barrel of a fire-arm.

Potassium chlorate has been widely used for many years as an oxidizing agent in priming compositions, but on account of the corrosive residues which it leaves in the barrel its replacement by some other substance is a problem to which close attention has been directed by manufacturers.

In this connection, barium nitrate and basic lead nitrate are widely used to replace potassium chlorate, but the employment of these substances is attended by certain disadvantages. Thus, barium nitrate and basic lead nitrate have lower oxygen values than potassium chlorate. Barium nitrate also abstracts heat from surrounding bodies in the process of complete break down, and this results in a lowering of the temperature of the cap flame. Again, although barium nitrate leaves non-corrosive residues, it frequently happens, especially in rimfire cartridges, that hard fused and gritty masses are left in the barrel after the firing of each shot. This interferes with succeeding shots and has a serious effect on accuracy of shooting.

The use of potassium nitrate has been proposed on the grounds that it leaves no objectionable residues and that it has a higher content of available oxygen than barium nitrate.

Experience has shown, however, that potassium nitrate is unsuitable for use in cap compositions when dry loading methods are employed, on account of its poor flowing properties and its marked hygroscopicity, which, although low when judged by ordinary standards, is yet sufficiently high to cause agglomeration of the priming composition. Further, its soft nature has an adverse effect on the sensitiveness of any priming composition in which it may be used.

I have now found that priming compositions, free from the above defects, may be prepared by using as an oxidizing agent a crystalline material obtained by crystallization from an aqueous solution containing potassium nitrate and barium nitrate, which is substantially a double salt of formula $K_2Ba(NO_3)_4$, and which is hereinafter referred to as potassium-barium nitrate.

In the solution from which the potassium-barium nitrate is crystallized I prefer to use an excess of potassium nitrate, since at ordinary temperatures the solubility of the double salt is intermediate between that of the less soluble barium nitrate and that of the more soluble potassium nitrate. The following proportions have, for example, been found convenient:

| | Parts |
|---|---|
| Potassium nitrate | 30 |
| Barium nitrate | 20 |
| Water | 100 | the solution being crystallized at about 50° C.

The composition of the crystallized material is slightly variable, but when using the above proportions the product when analyzed usually gives about 55% barium nitrate and 45% potassium nitrate.

The following type of priming composition is given by way of example to illustrate the invention:

*Example*

| | Percent by weight |
|---|---|
| Mercury fulminate | 20–45 |
| Potassium-barium nitrate | 30–60 |
| Lead thiocyanate | 10–40 |

Priming compositions containing potassium-barium nitrate leave substantially no corrosive residues in the barrel, and the presence of the potassium nitrate component in the material prevents the formation of the fused masses experienced with barium nitrate alone, to which reference has been made above. In physical form potassium-barium nitrate is hard like barium nitrate, and possesses similar hygroscopic properties to the latter, but contains about 30% more available oxygen than it. Under manufacturing conditions, the loading density of priming compositions containing potassium-barium nitrate is similar to that of priming compositions containing barium nitrate, so that plant adapted for filling caps when containing barium nitrate can be used for the compositions of the present invention.

A further advantage which results from the replacement of barium nitrate by potassium-barium nitrate in priming compositions is the increase in the heat liberated by the ignition of the composition, and an increase in the temperature of the flame produced.

Moreover, in the case of compositions containing lead styphnate and barium nitrate, a very vivid muzzle flash is produced on ignition, especially when the propellent to be initiated is cordite. This muzzle flash is materially reduced or eliminated when in accordance with my invention potassium barium nitrate is substituted for barium nitrate in such compositions.

Having now particularly described and ascertained the nature of my said invention and in what manner the same is to be performed, I declare that what I claim is:

1. A priming composition containing as an ingredient 30 to 60 parts of potassium-barium nitrate.

2. A priming composition comprising mercury fulminate and potassium-barium nitrate.

3. A priming composition comprising mercury fulminate, potassium-barium nitrate, and lead thiocyanate.

4. A priming composition comprising 20 to 45 parts mercury fulminate, 30 to 60 parts potassium-barium nitrate, and 10 to 40 parts lead thiocyanate.

5. A priming mixture comprising the double salt of potassium nitrate and barium nitrate as an oxidizing agent.

ALFRED WEALE.